Sept. 17, 1968   R. W. ASTHEIMER   3,402,295
PROCESS FOR MEASURING THE DISTANCE FROM THERMAL
DISCONTINUITIES IN THE ATMOSPHERE
Filed April 16, 1965   4 Sheets-Sheet 1

INVENTOR.
ROBERT W. ASTHEIMER
BY
ATTORNEY

Sept. 17, 1968  R. W. ASTHEIMER  3,402,295
PROCESS FOR MEASURING THE DISTANCE FROM THERMAL
DISCONTINUITIES IN THE ATMOSPHERE
Filed April 16, 1965  4 Sheets-Sheet 3

INVENTOR.
ROBERT W. ASTHEIMER

BY
*Robert Ennes Norton*
ATTORNEY

3,402,295
PROCESS FOR MEASURING THE DISTANCE FROM THERMAL DISCONTINUITIES IN THE ATMOSPHERE

Robert W. Astheimer, Westport, Conn., assignor to Barnes Engineering Company, Stamford, Conn., a corporation of Delaware
Continuation-in-part of applications Ser. No. 364,151, May 1, 1964, Ser. No. 411,934, Nov. 17, 1964, and Ser. No. 440,352, Mar. 4, 1965. This application Apr. 16, 1965, Ser. No. 448,694
2 Claims. (Cl. 250—83.3)

ABSTRACT OF THE DISCLOSURE

A temperature discontinuity in the atmosphere such as one resulting in so-called "clear air turbulence" is measured by aiming an infrared radiometer horizontally, scanning spectrally, and comparing the wavelength of peak radiation with a tangible relationship, such as a graph, of distance versus peak wavelength of radiation, the radiation being from a carbon dioxide emission band.

Related applications

This application is in part a continuation of my earlier applications 364,151 filed May 1, 1964, 411,934 filed Nov. 17, 1964, and Ser. No. 440,352 filed Mar. 4, 1965. The first two applications above mentioned are now abandoned.

Background of the invention

A considerable problem has arisen by reason of what is known as "clear air turbulence." For high flying aircraft this is a serious problem because there is no visual indication of turbulence as is the case with thunder storms and similar phenomena where the cloud forms give a pilot warning. Several fatal accidents with turboprop airplanes have been attributed to clear air turbulence which apparently broke off wings under conditions where there were no clouds. A particularly important instance is presented by the jet stream, at one edge of which there is high turbulence although the air is perfectly clear. High flying airplanes, of course, tend to use the jet stream when flying from west to east in order to save fuel, and it is, therefore, a serious problem to warn the pilot of the turbulent edge so that it can be avoided. Generally the best action to take when an area of turbulence is to be encountered is to slow up the speed of the plane. Sometimes it is possible to avoid the turbulent area, but often the area is too large or the warning time too short, or both. However, if the airplane is slowed up, there is usually no danger to the plane.

Summary of the invention

It has been found that clear air turbulence is associated with a rise in temperature, and the present invention is, therefore, concerned with a process for measuring temperature discontinuities sufficiently far ahead of the aircraft to provide the necessary warning of impending danger. The measurement may be ahead of the aircraft, preferably associated with a suitable computer, to permit reduction of airspeed or other corrective measures. It is also possible to measure the temperature to one side of the plane so that it can be flown to maintain a constant distance from the dangerous belt of turbulence where, as will often be the case in flying the jet stream, the direction of the line of turbulence is substantially along the line of flight or at a small angle thereto.

The present process utilizes infrared radiation from carbon dioxide absorption bands. There are two bands in the atmosphere, one centering at $4.3\mu$ and the other in the vicinity of $13-15\mu$. As the $13-15\mu$ band is near the radiation maximum for the temperatures encountered at high levels in the atmosphere, greater energy is available, but with detectors of suitable sensitivity, radiations in the $4.3\mu$ band are useful.

Carbon dioxide is substantially uniformly distributed throughout the atmosphere, and therefore at any altitude the level of radiation is determined, among other things, by the path length, which is a measure of the number of molecules of carbon dioxide involved. The present process should not be confused with a proposal to measure a vertical temperature profile of the atmosphere from a satellite. The latter does not determine temperature discontinuities, and involves different and much more complicated mathematical relationships than those encountered in the present invention. Radiation from gaseous constituents follows more or less exactly an equation developed by Elsasser. However, this involves awkward mathematics and instrumental calibration, and therefore the simpler expression provided by Beer's law is used in the present process because it is sufficiently close to the theoretically more perfect relations set out by Elsasser so that the differences in measurement are not significant in the practical use of the present invention. Since the measurements are horizontal, and therefore there is no significant difference in atmospheric pressure, the concentration per unit volume of atmosphere which is otherwise a factor in a complete statement of Beer's law is constant, and so a simplification of Beer's law is used and $A=1-E^{-kl}$, in which A is the $CO_2$ absorption, $k$ is the specific absorption of $CO_2$ at a particular wavelength, and $l$ is the path length.

It has been found that the distance to a line of thermal discontinuity is substantially proportional to the reciprocal of the carbon dioxide absorption coefficient at the wavelength of maximum radiation. Therefore, if the band $13-15\mu$ is spectrally scanned by a radiometer, the wavelength of maximum radiation is a measure of the distance to the thermal discontinuity. This is the relationship on which the process of the present invention is based.

Since the present invention is a process, it is not concerned with any particular exact design of scanning radiometer. In the more specific description there will be described two practical radiometer types utilizing the principles of multiple reflections which form the basis of Fabry-Perot interferometers. These scanning radiometers give excellent results, and are claimed, as well as described, in my earlier application Ser. No. 440,352 filed Mar. 5, 1965, referred to above. However, the present invention is not limited to the use of those particular types of instruments, and any other scanning radiometer may be used, which may be a spectrometer, filter wheels with sharp interference filters, a rotating disc scanner with an interference filter of progressive increase in thickness around the disc, and the like. It should be noted, and will become apparent from the specific description, that the scanning must be of high resolution. This is easily possible with the scanning radiometers operating on the Fabry-Perot principle, but presents certain problems with continuous interference filter scanners such as the last mentioned, which are difficult to produce, and at present not commercially available, in a resolution sufficiently high for the purposes of the present invention. The specific description of the invention will therefore be in terms of scanning radiometers of the Fabry-Perot type.

*Description of the preferred embodiments*

Figure 1:
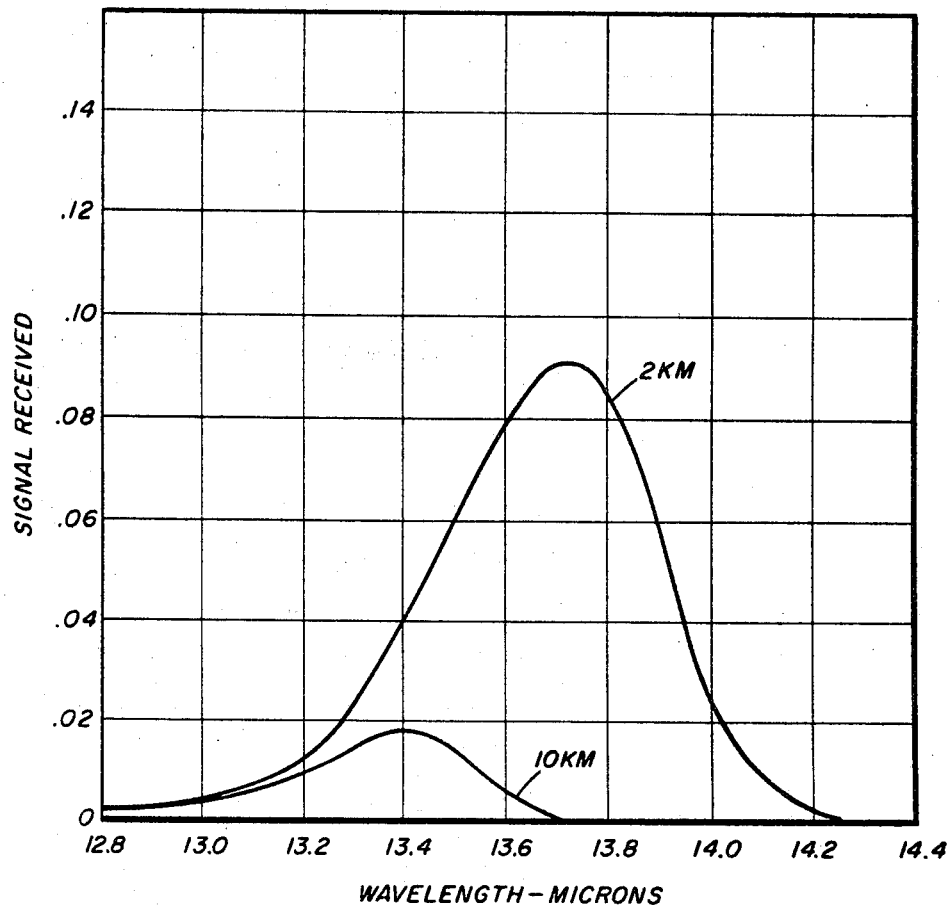
FIG. 1 is a series of curves of radiation response to a turbulent discontinuity at different distances.
Figure 2:
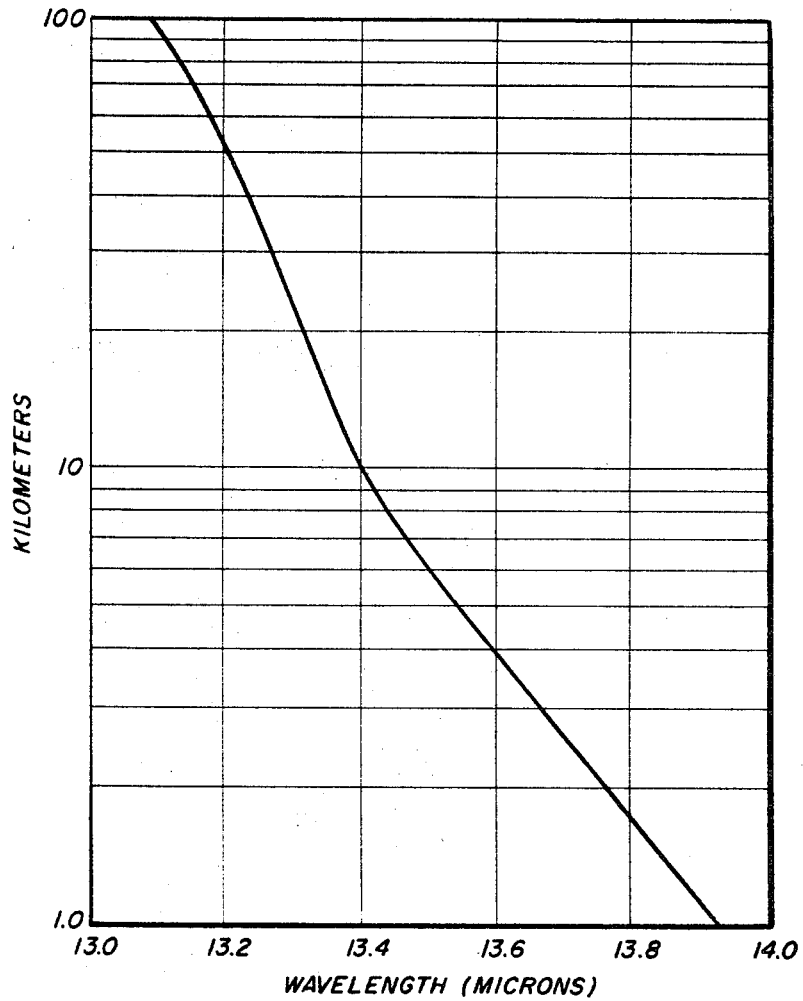
FIG. 2 is a graph of distance versus wavelength for distances up to about 100 km.

FIGS. 1 and 2 show curves at 30,000 ft. altitude, from which the basic relationship underlying the present invention is clearly shown, namely, that the wavelength of maximum radiation measures the distance of the thermal discontinuity. It will be noted that the curves in FIGS. 1 and 2 represent relationships between wavelength of peak radiation and distance in tangible form, which is shown in the figures by way of illustration as a graph.

While theoretically from FIG. 2 it would appear that there is no practical limitation on the distance at which a thermal discontinuity can be measured, in practice there are certain limitations due to instrument sensitivity, and signal-to-noise ratio. At 30,000 ft. altitude, with a turbulent band width of 0.5 km. and a temperature discontinuity of 1° C., it is possible to measure up to a distance of 10 km. while retaining a signal-to-noise ratio of at least 4. These factors are obtained with an instrument using a good immersed thermistor bolometer, which will be described in more detail in FIGS. 3 and 4. With higher temperature differences and a greater depth-of-turbulence zone, greater distances can be measured. In general distances will increase with higher altitudes, and hence lower atmospheric pressure. However, even 10 km. is a sufficient distance to give warning so that an aircraft can make appropriate changes in speed and direction. Even if the aircraft cannot entirely avoid the zone of turbulence, it can at least slow down so the damage will be minimized, and when flying along the edge of the jet stream and monitoring the turbulent zone on the northern edge thereof, practically useful flight courses can be maintained.

Figure 3:
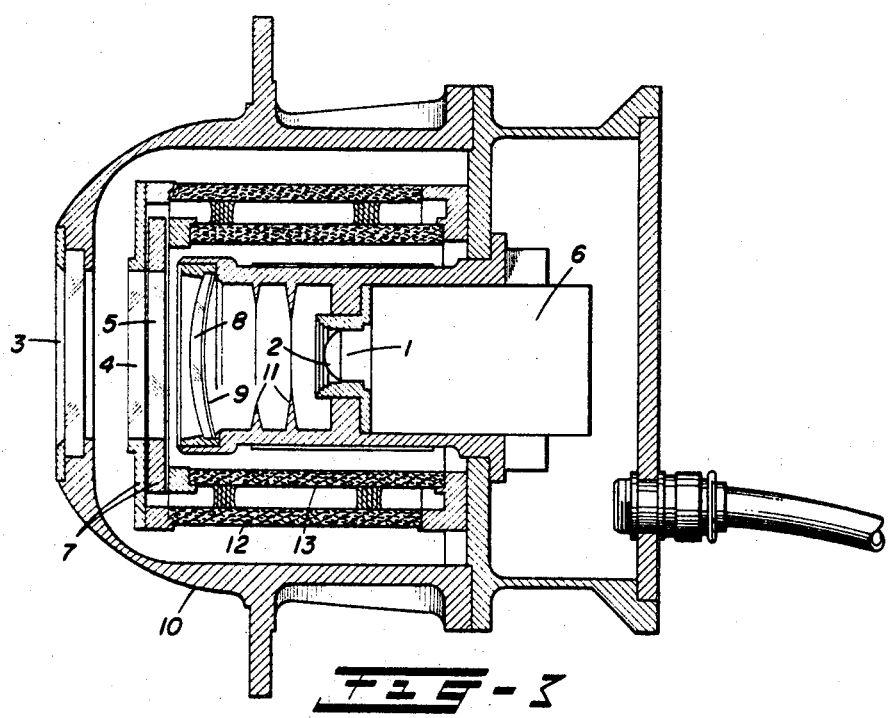
FIG. 3 is a section through a scanning radiometer utilizing Fabry-Perot mirrors with scanning produced by changes in mirror spacing.

FIG. 3 shows a practical instrument employing a Fabry-Perot scanner in which scanning is effected by varying the spacing of the Fabry-Perot plates. The instrument is provided with an immersed thermistor bolometer 1 on a silicon or germanium immersion lens 2. The Fabry-Perot plates 4 and 5 are mounted on piezo-electric cylinders 12 and 13 which are fed with suitable driving voltage which may be about 600 v. peak-to-peak with barium titanate cylinders. A window 3 of Irtran is provided in the housing 10 of the instrument. Behind the Fabry-Perot plates is located an objective 8 with an order-selecting filter 9 on its back. This filter preferably selects the 7th order when operating on the 13–15μ band. Baffles 3 prevent stray light from entering the immersed bolometer, and the preamplifier electronics are shown at 6. The plates 4 and 5 are mounted in rings 7 which clamp on the ends of the cylinders 12 and 13. With the 7th order of wavelength, the spacing of the plates 4 and 5 in the center of the scan approximates 49μ.

Figure 6:
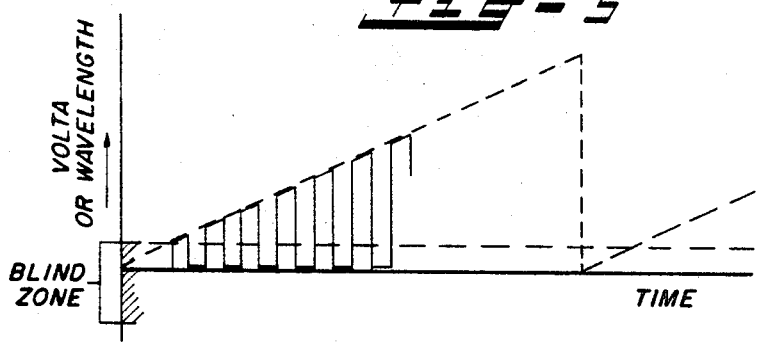
FIG. 6 is a graph of modulated driving voltages for an instrument performing the functions of FIG. 5.

It is perfectly possible to scan uniformly, but the scan is fairly slow, for example .5 cycle, and amplification at scanning frequencies requires rather cumbersome electronics. It is therefore desirable to modulate the sawtooth wave which would be used to drive the piezo-electric cylinders, as is shown in FIG. 6. The modulation may, for example, be 100 cycles, which permits more satisfactory electronics.

Figure 5:
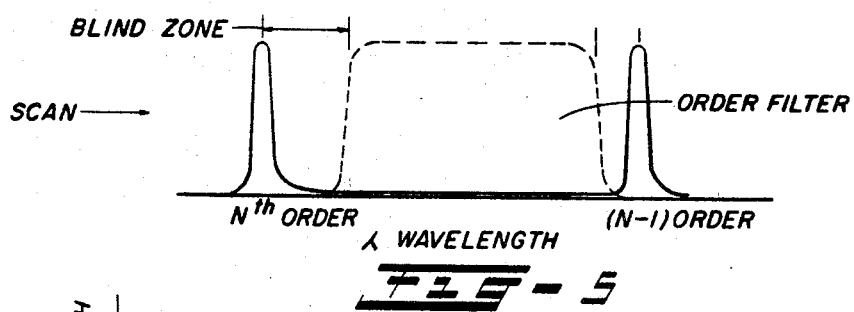
FIG. 5 is a curve showing signal response from an instrument having combined chopping and scanning functions.

It is also possible to use an order-selecting filter which selects a narrower band than that between the wavelengths of the two orders chosen, so that there will be an area in the scan when no signal will pass because it encompasses wavelengths for which the order-selecting filter cuts off. The wavelength range of the order-selecting filter is typically 50–85% of the range between orders, with 80% a practical value. The reason for the significant width of the zone in the scan in which no signal is transmitted and which will be referred to as the "blind" zone, is that order filters with cut-off edges so sharp that they are substantially vertical on a graph represent ideals which are not obtainable in practical filters. There is always a certain slope to the two edges, and so if the blind zone is too small a percentage of the wavelength range between the orders chosen, the zone may not include a sufficiently complete cutoff for practical use. The operation is shown in FIG. 5, which is a graph of signals showing two orders, $n$ and $n-1$, with the order-selecting filter chosen to transmit over approximately 80% of the range between the two orders. The instrument is initially calibrated by turning off the driving voltage for the transducers moving the plates, and adjusting the spacing of the plates manually with micrometric screws or other means which are common in Fabry-Perot spectrometers, until the spacing corresponds to an edge of the blind zone. Then when the scanning voltage is turned on, the spectrometer scans through a range approximately the separation of the two orders chosen, and produces a wave form with an initial substantially zero radiation signal corresponding to the blind zone. If the radiation is of uniform intensity over the scan, the shape of the output wave of the signal from the radiation detector will show a substantially zero line for the blind zone, and then will rapidly increase as the order selecting filter cuts on, remaining high until the wavelength is reached where the order-selecting filter cuts off. In other words, the signal is clamped to a low output which may be substantially zero for an interval corresponding to the blind zone width during each scan. This provides a recurring reference signal level which is of importance for many scanning spectrometer uses.

If it is desired to operate in the band near 4.3μ, different detectors may be used, such as cooled photodetectors which provide additional sensitivity, as there is less intense radiation in this band than in the preferred band at 13–15μ.

Figure 4:
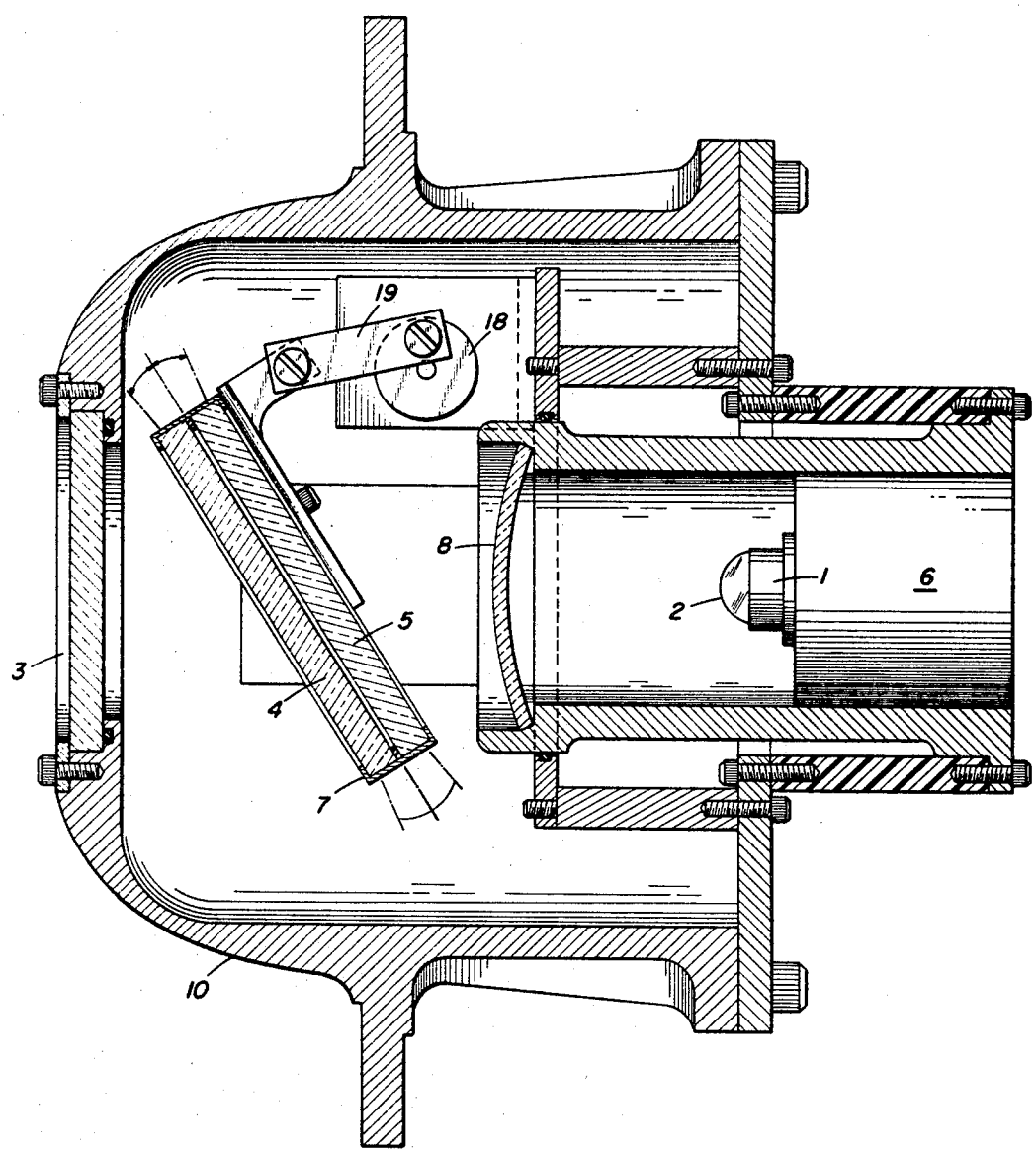
FIG. 4 is a section through a modified scanning radiometer using Fabry-Perot plates of fixed spacing and rocking the Fabry-Perot etalon to effect scanning.

FIG. 4 illustrates a modified form of Fabry-Perot scanner in which the etalon of plates 4 and 5 is rocked through a small angle, for example 30°, the spacing between the plates in the etalon remaining constant. The plates 4 and 5 are fixed in a circular mount 7 as described above, and the whole etalon is rocked by means of an eccentric 18 and linkage 19. The eccentric is of course driven by a motor which is conventional and not shown. Scanning is exactly the same, but obviously the scanning is not a linear function as in FIG. 3 where the scanning results from changing the spacing of the Fabry-Perot plates. This, however, presents no problem.

In every case, the spectral scanning permits determining the wavelength of maximum radiation, using, for example a typical readout, which may be an oscilloscope, the curves are similar to those shown in FIG. 1, and it will be noted that in this case a distance of 10 km. corresponds to a radiation maximum of 13.4μ.

I claim:
1. A process of determining the horizontal distance to a thermal discontinuity in air which comprises,
   (a) producing a relation of peak wavelength to distance in a tangible or real form,
   (b) spectrally scanning across a carbon dioxide emission band, while viewing in a horizontal direction,
   (c) measuring the wavelength of maximum radiation, and
   (d) comparing said wavelength of maximum radiation with the relation in tangible form between peak wavelength of maximum radiation and distance and indicating distance from the thermal discontinuity from said comparison.

2. The process according to claim 1 in which the band is the 13–15$\mu$ band of carbon dioxide.

References Cited

UNITED STATES PATENTS

| 2,830,487 | 4/1958 | Griffith | 250—83.3 |
| 3,103,586 | 9/1963 | Ovrebo et al. | 250—83.3 |

ARCHIE R. BORCHELT, *Primary Examiner.*